United States Patent
Leheup

(10) Patent No.: US 10,419,434 B2
(45) Date of Patent: Sep. 17, 2019

(54) METHOD AND DEVICE FOR IMPROVING THE PROTECTION OF A MULTIMEDIA SIGNAL AGAINST A MALICIOUS ATTACK

(71) Applicant: STMicroelectronics SA, Montrouge (FR)

(72) Inventor: Jocelyn Leheup, Asnieres-sur-Seine (FR)

(73) Assignee: STMicroelectronics SA, Montrouge (FR)

( * ) Notice: Subject to any disclaimer, the term of this patent is extended or adjusted under 35 U.S.C. 154(b) by 155 days.

(21) Appl. No.: 15/358,854

(22) Filed: Nov. 22, 2016

(65) Prior Publication Data
US 2017/0346825 A1    Nov. 30, 2017

(30) Foreign Application Priority Data
May 31, 2016    (FR) ..................... 16 54870

(51) Int. Cl.
| | |
|---|---|
| *H04L 29/06* | (2006.01) |
| *H04N 21/4405* | (2011.01) |
| *H04N 21/4623* | (2011.01) |
| *H04N 21/4627* | (2011.01) |
| *G06F 21/10* | (2013.01) |

(52) U.S. Cl.
CPC .............. *H04L 63/10* (2013.01); *G06F 21/10* (2013.01); *H04L 63/0428* (2013.01); *H04L 63/102* (2013.01); *H04L 63/1416* (2013.01); *H04L 63/1425* (2013.01); *H04L 63/1441* (2013.01); *H04L 63/20* (2013.01); *H04N 21/4405* (2013.01); *H04N 21/4623* (2013.01); *H04N 21/4627* (2013.01)

(58) Field of Classification Search
CPC ....... G06F 21/10; H04L 63/10; H04L 63/102; H04L 63/1416; H04L 63/1425; H04L 63/1441; H04L 63/0428; H04N 21/1405; H04N 21/4623; H04N 21/4627
See application file for complete search history.

(56) References Cited

U.S. PATENT DOCUMENTS

| | | |
|---|---|---|
| 9,152,798 B1 | 10/2015 | Drewry et al. |
| 2006/0069926 A1* | 3/2006 | Ginter ............... G06F 21/10 |
| | | 713/194 |

(Continued)

FOREIGN PATENT DOCUMENTS

| | | |
|---|---|---|
| EP | 2698736 A2 | 2/2014 |
| EP | 2804123 A1 | 11/2014 |
| WO | 2004021700 A1 | 3/2004 |

OTHER PUBLICATIONS

INPI Search Report and Written Opinion for FR 1654870 dated Dec. 15, 2016 (10 pages).

*Primary Examiner* — Ashokkumar B Patel
*Assistant Examiner* — William B Jones
(74) *Attorney, Agent, or Firm* — Crowe & Dunlevy

(57) ABSTRACT

A device protects an incoming multimedia signal with a protection that is controllable and configured for enabling or disabling an application for an interface protection on an outgoing signal coming from the incoming signal. An output interface is configured for delivering the outgoing signal on an output. An authorization process is performed for authorizing or otherwise a control over the enabling or disabling of the interface protection application depending on security rules.

30 Claims, 2 Drawing Sheets

(56) References Cited

U.S. PATENT DOCUMENTS

| | | |
|---|---|---|
| 2011/0099255 A1* | 4/2011 | Srinivasan .......... H04L 41/0866 709/221 |
| 2012/0151580 A1 | 6/2012 | Chae et al. |
| 2012/0173877 A1 | 7/2012 | Pendakur et al. |
| 2012/0278869 A1* | 11/2012 | Guccione .............. H04L 63/102 726/5 |
| 2014/0095918 A1 | 4/2014 | Stahl et al. |
| 2014/0143798 A1* | 5/2014 | Marino .............. H04N 21/4325 725/31 |
| 2014/0233732 A1 | 8/2014 | Buer et al. |
| 2016/0070887 A1 | 3/2016 | Wu et al. |
| 2016/0255051 A1* | 9/2016 | Williams ............ H04L 63/0236 726/1 |
| 2017/0105171 A1* | 4/2017 | Srivastava ............ H04L 67/327 |
| 2017/0201541 A1* | 7/2017 | Kapoor .............. H04L 63/1425 |

\* cited by examiner

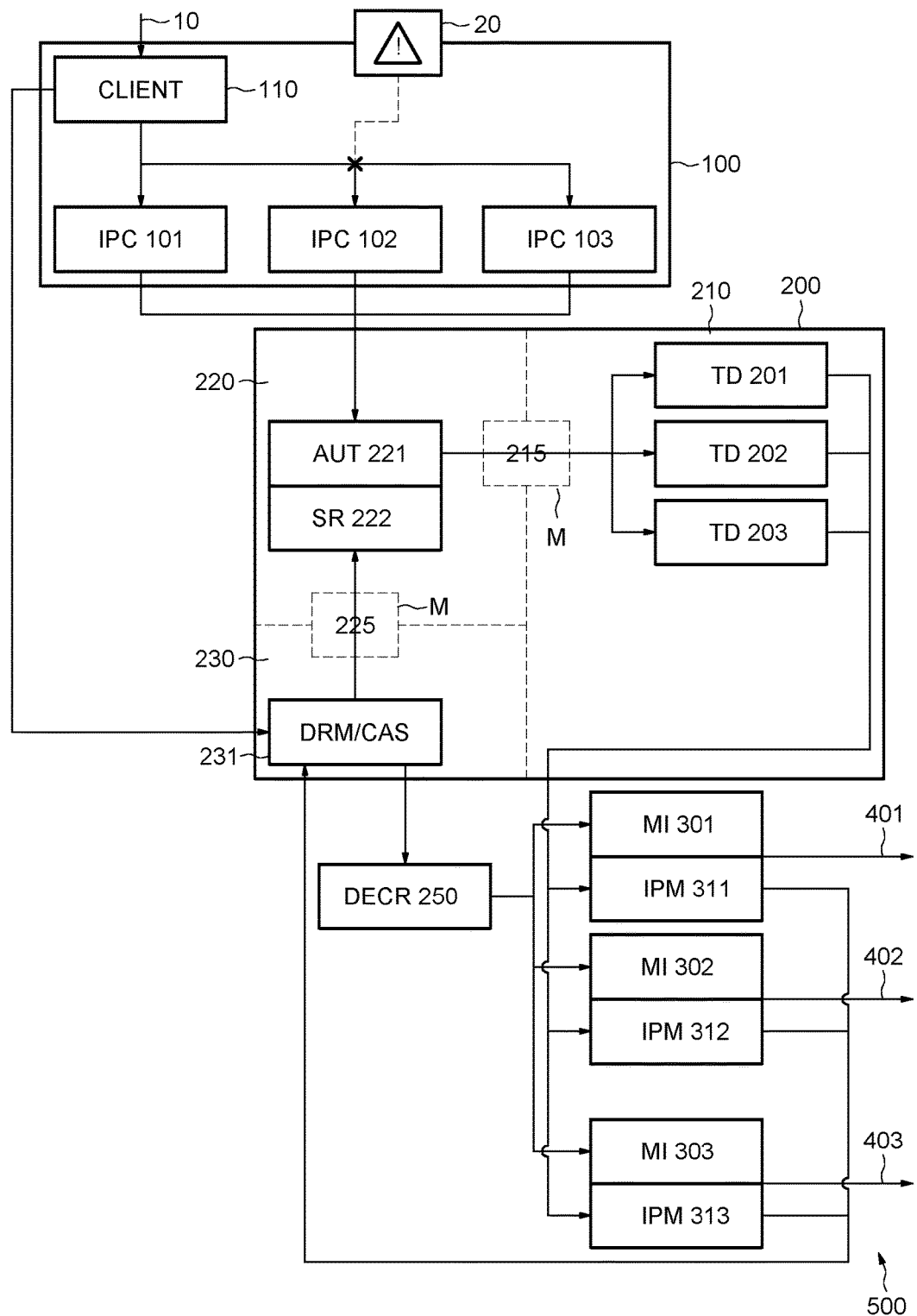

METHOD AND DEVICE FOR IMPROVING THE PROTECTION OF A MULTIMEDIA SIGNAL AGAINST A MALICIOUS ATTACK

PRIORITY CLAIM

This application claims the priority benefit of French Application for Patent No. 1654870, filed on May 31, 2016, the disclosure of which is hereby incorporated by reference.

TECHNICAL FIELD

Various embodiments of the invention and their implementation relate to the protection of digital systems and signals against malicious attacks, for example in the context of the management of digital rights and of conditional access systems.

BACKGROUND

"On-demand" on-line services are increasingly common and present on multiple platforms, such as personal computers, decoders for television connected to the Internet, mobile telephones or tablets.

However, these services need to be protected against malicious users or software programs trying to illicitly exploit the data supplied by these services, in particular in the field of on-demand videos or of pay television.

Technical protection measures are therefore implemented in order to control the use that is made of digital works. For example, a Conditional Access System (or CAS) is generally set up in the framework of the broadcasting of a video and audio content, or multimedia content.

In summary, in a CAS process, the multimedia content is encrypted by servers by virtue of a symmetrical key and the content broadcast is only accessible to the clients possessing the key.

Furthermore, notably in the framework of downloading of a data stream (or "Streaming") or of a bulk downloading of data, digital rights management (or DRM) systems are set up.

In summary, in a DRM process, a client sends to a server an identification key specific to the client. If this client is authorized to access the content, the server encodes a content key by virtue of the identification key and transmits the encoded content key to the authorized client who is the only one able to decode it. The encrypted multimedia content is subsequently transmitted to the client who can decrypt it thanks to the decoded content key.

The processes of encryption-decryption are implemented by encryption-decryption means, generally formed by autonomous and secure hardware circuit blocks. The encryption-decryption means are controlled and managed by a digital rights management means DRM and a conditional access means CAS, henceforth referred to as management means.

The management means may be implemented in a secure area known as a "Trusted Execution Environment" (or TEE) of a processing system of the electronic support, which is generally the main processor.

The TEE notably allows secure software programs, referred to as trusted applications, to be executed in a secure manner disposing of an average allocated processing capacity and secure memory. The processing systems generally comprise a hardware-secured element (or SE for "Secure Element") having little processing capacity but an excellent security. Conversely, the processing systems comprise an area allocated to an operating system (or REE for "Rich Execution Environment") disposing of significant resources but which are not very secure and therefore very exposed to external attacks.

Furthermore, multimedia output interface protections have been developed and are required notably depending on the services of the multimedia content providers. For example, a version of the protection HDCP may be required on a digital video and audio output interface of the HDMI or DVI type.

There also exist protections for analogue video and audio outputs, of the CGMS-A or "Macrovision" type. Transcoding protections may be required, notably the DTCP protocol in the framework of a wireless communication of the WiFi type. Specific protections of the digital watermarking type, consisting in integrating into the multimedia content a mark invisible to a person but traceable by machine, may furthermore be required.

The application of the multimedia output interface protection required and the delivery of a multimedia signal on a multimedia output interface are generally controlled by respective drivers using the REE.

The means for implementing the multimedia output interface protection, referred to as protection means, and the delivery means, referred to as multimedia output interface, are generally formed by autonomous and secure hardware circuit blocks.

In view of the diversification of the media that can benefit from multimedia services protected by CAS and DRM, and therefore of the diversification of the risks of fraud, it is desirable for the systems-on-a-chip (SoC) implementing these services to be robust against malicious attacks, and notably as regards multimedia interface protections.

For this purpose, it may be envisaged to migrate the control and the application of the multimedia interface protections in their entirety into a TEE secure area. However, this requires the TEE to have a processing capacity that is sufficiently large to directly control the multimedia output interface protection, and migration of such systems has many technological constraints. Indeed, many existing hardware blocks, each providing a function established and designed using a given technological process, would be subject to severe modifications or even new designs.

SUMMARY

In order to overcome these constraints, simple embodiments and their implementation are provided for improving the protection of a signal, for example at audio/video outputs of multimedia devices, notably against a malicious attack, by verifying in a secure manner whether the control of a multimedia output interface protection, or interface protection, is being applied in a manner that conforms with the protection normally required.

Thus, according to a first aspect, a method is provided for protection of at least one incoming multimedia signal in a multimedia system, comprising a controllable enabling or disabling of an application of at least one interface protection to at least one outgoing signal coming from the at least one incoming signal and delivered by at least one multimedia output interface of the system.

According to a general feature of this aspect, the control of the enabling or of the disabling of the interface protection application is authorized or otherwise depending on security rules.

By way of example, the security rules represent and prescribe the protection potentially required for the signal during its processing on a targeted multimedia output interface, it being understood that other incoming signals may respectively require specific interface protections, which may be included within the same security rules, for other potential multimedia output interfaces of the system.

According to one embodiment, the control of the application of an interface protection is authorized if this application to the outgoing signal offers a degree of protection at least equal to a degree of protection defined in the security rules.

The incoming multimedia signal may require a specific interface protection, in which case the security rules comprise the specific interface protection required by the signal for the multimedia output interface.

In other words, the security rules can prescribe, or indicate, the minimum degree of protection required for each of the incoming signals into the multimedia system on each of the multimedia output interfaces of the system.

According to one embodiment, in the case where the security rules do not prescribe any protection for the incoming signal, a potential command for enabling an application of an interface protection for the outgoing signal is always authorized.

According to one embodiment, a command for disabling an application of an interface protection previously enabled for the outgoing signal is authorized only if the outgoing signal has been delivered in its entirety on a multimedia output interface.

The outgoing signal may be processed by packets of data, the security rules being updated when each packet has been delivered by the output interface, in accordance with the specific protection required by each packet delivered.

The incoming multimedia signal may require a specific interface protection, in which case a protection action is applied to the outgoing signal if the outgoing signal delivered by the multimedia output interface of the system does not have an interface protection with a degree of protection at least equal to the degree of protection of the specific interface protection.

According to one embodiment, the outgoing signal comprises a multimedia data stream coming from a decryption of an incoming stream of encrypted data of the incoming signal.

For example, the protection action comprises the non-triggering of the decryption.

The decryption may be carried out prior to the controllable enabling or disabling of an application of an interface protection, in which case the protection action comprises the interruption of the decryption.

According to another aspect, a computer program product is provided that may be directly loaded into a memory of a data processing system, comprising portions of code of software for the execution of the method of protection defined hereinbefore when the program is executed on the data processing system.

A medium readable by a data processing system is also provided, having instructions executable by a computer adapted for causing the execution by the data processing system of the method of protection defined hereinbefore.

According to another aspect, a protection device is provided for at least one incoming multimedia signal, comprising at least one protection means controllable by a respective control means and configured for enabling or disabling an application of an interface protection to at least one outgoing signal coming from the at least one incoming signal and at least one output interface configured for delivering the at least one outgoing signal on at least one output.

The device comprises, according to a general feature of this aspect, an authorization means configured for authorizing or otherwise the control of the enabling or of the disabling of the interface protection application depending on the security rules.

According to one embodiment, the authorization means is configured for authorizing a command for the enabling or for the disabling of an application of an interface protection if this application to the outgoing signal offers a degree of protection at least equal to a degree of protection defined in the security rules.

According to one embodiment, the incoming signal requires a specific interface protection, and a management means is configured so that the security rules comprise the specific interface protection required by the signal for the multimedia output interface, it being understood that other incoming multimedia signals may require respective specific interface protections, which may be included within the same security rules, for other potential multimedia output interfaces of the system.

The authorization means may notably be configured for, in the case where the security rules do not prescribe any protection for the incoming signal, always authorizing a potential command for enabling an interface protection application for the outgoing signal.

According to one embodiment, the authorization means is configured for authorizing a command for disabling an application of an interface protection previously enabled if the outgoing signal has been delivered in its entirety on a multimedia output interface.

Advantageously, the protection device is configured for processing the incoming signal by packets of data, and the management means is configured for updating the security rules when each packet has been delivered by the output interface, in accordance with the specific protection required by each packet delivered.

The incoming signal may require a specific interface protection, in which case the management means is advantageously configured for applying a protection action to the outgoing signal if the outgoing signal delivered by the multimedia output interface of the system does not have an interface protection with a degree of protection at least equal to the degree of protection of the specific interface protection.

According to one embodiment, the outgoing signal comprises a multimedia data stream coming from a decryption, triggered by the management means and implemented by a decryption means, of an incoming stream of encrypted data of the incoming signal.

For example, the management means may be configured for applying the protection action while not triggering the decryption.

The management means may be configured for triggering the decryption prior to the controllable enabling or disabling of an application of an interface protection, and for applying the protection action by interrupting the decryption.

The management means may be configured for reading the state of the multimedia output interface protection for example in a status register for the protection means.

The authorization means is advantageously incorporated into at least one secure area of at least one processor.

According to another aspect, a multimedia reader system is provided that is capable of reading a multimedia data stream, comprising a protection device such as defined hereinbefore.

For example, such a system may be formed or be included within a television decoder, a personal computer, a mobile telephone or a touchscreen tablet.

Thus, the embodiments and their implementation defined hereinabove provide simple solutions for improving the protection of digital works, in a system within which the interface protection controllers are, in the main, implemented within an unprotected area of a processing system.

Consequently, the constraint of a high processing power for a TEE secure area in order to carry out this control is avoided.

Furthermore, the solution provided can easily be applied to systems-on-a-chip for which no protection had originally been developed.

Furthermore, this solution is compatible with future rules for toughening of the security of systems of the DRM or CAS type without major modification of a system-on-a-chip implementing them.

BRIEF DESCRIPTION OF THE DRAWINGS

Other advantages and features of the invention will become apparent from the detailed description of embodiments and their implementation, which are in no way limiting, and from the appended drawings in which:

FIG. 2 shows, more precisely, one embodiment of a protection device for a signal.

DETAILED DESCRIPTION OF THE DRAWINGS

Figure 1:
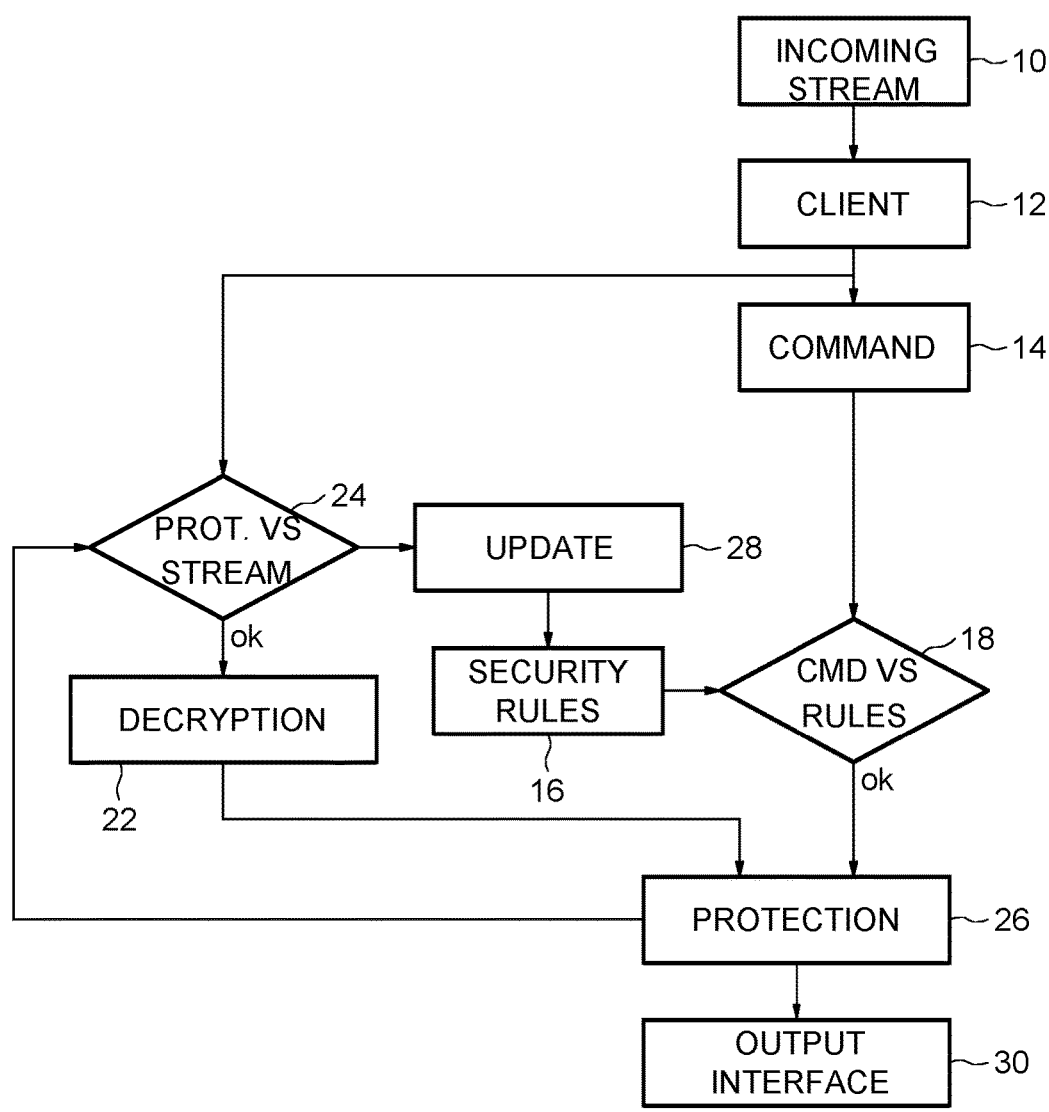
FIG. 1 shows a functional diagram of one embodiment of a method for protection of a signal against a malicious attack.

FIG. 1 shows a functional diagram of one embodiment of a method for protection of a signal against a malicious attack. An incoming stream signal of encrypted multimedia data 10 is received by a client 12, which may for example be an on-demand video program from a television decoder connected to the Internet, and is designed to be decrypted 22 and delivered on a multimedia output interface 30.

The incoming stream 10 requires the application of a specific multimedia output interface protection, in other words the data of the incoming stream 10 indicate to the client 12 which interface protection should be applied for the delivery of this data stream, after decryption 22.

Such a request, or indication, generally originates from the multimedia content provider depending on the multimedia content.

Usually, controllers 14 implemented within an REE unsecure area of a processor are capable as such of controlling and configuring a means allowing an output interface protection to be applied to the stream to be delivered at the output 30.

However, if a controller 14 is corrupted for example by a malicious program, it is possible for this controller to send erroneous commands to the interface protection.

Thus, in this embodiment, a verification 18 is advantageously carried out of the conformity of the command from the controller 14 with security rules 16. The security rules 16 represent and prescribe the protection required for the stream being processed, referred to as current stream, on a targeted output interface.

If the command conforms to the security rules 16, then the command is authorized 18.

For example, if the control does not command a protection having a degree of protection lower than the degree of protection of the protection prescribed by the security rules, the command is transmitted.

The control of the enabling or of the disabling of an application of an interface protection thus transmitted can then configure the means allowing an interface protection 26 to be applied.

If the command 14 is for enabling an application of an output interface protection, for example in the case where the security rules do not prescribe any protection for the incoming signal, then the command 14 is always authorized 18.

If the command 14 is for disabling, whereas the security rules prescribe an active protection, then the command is only authorized in the case where the signal has been delivered in its entirety on a targeted output interface.

In other words, an interface protection enabled for a given signal can only be disabled after the processing of the signal has finished.

Otherwise, the command is not authorized and the output interface protection is not modified.

If the command 14 is for disabling and if the security rules 16 do not prescribe any protection on the targeted output interface, then the command is authorized; this is notably the case for incoming data not requiring any protection.

In parallel, the interface protection 26 is compared 24 with the interface protection required by the incoming stream of encrypted data 10.

If the protection 26 does not conform to the protection required, then, in a first case, the decryption 22 is not triggered, or else, in a second case, interrupted in the case where the decryption 22 is implemented prior to the command 14 of the output interface protection.

The first case corresponds to a DRM context in which the interface protection required is known prior to decryption, for example for a continuous download stream.

The second case corresponds to a CAS context in which the interface protection required is not known prior to decryption of the incoming stream of data, for example for a broadcast of a pay multimedia content.

If the protection 26 has a degree of protection at least equal to that of the protection required, the decryption 22 is triggered and the outgoing stream of decrypted multimedia data may be transmitted over an output interface. Furthermore, the security rules are updated for the processing of this signal 10.

FIG. 2 shows, more precisely, one embodiment of a protection device for a signal, in particular for a multimedia reader system 500. The multimedia reader system is capable of reading a multimedia data stream, for example in the framework of an on-demand video service or of pay television. For example, this type of system 500 may be an electronic system-on-a-chip forming or being included within a television decoder, a personal computer, a mobile telephone, a tablet or any other system capable of reading a multimedia content.

The system 500 comprises a processing element, such as a microprocessor for example, comprising an area allocated to the operating system (REE) 100, generally not very secure by nature, together with a secure area (TEE) 200.

In the REE 100, a client 110, for example a video-on-demand program from a television decoder connected to the Internet, is notably able to manage interface protection controllers (IPC), there being three of them 101, 102, 103, in the example shown here.

The interface protection controllers 101-103 form a control means for respective interface protection means (IPM) 311-313, configured for applying an interface protection to an outgoing signal 401-403 delivered on respective multimedia interfaces (MI) 301, 302, 303. Furthermore, the system 500 comprises a decryption (DECR) means 250 configured for decrypting an incoming encrypted signal 10 and controlled by a management means 231.

The decryption means 250, together with the interfaces 301-303 and their respective protection means 311-313, are generally formed by independent and secure hardware blocks.

The multimedia interfaces 301-303 may for example be an HDMI output, a DVI output, a wireless port of the WiFi type, or an analog audio-video output, and may of course be more numerous, or less numerous, depending on the capacities and on the technology of the multimedia reader system 500.

The interface protection controllers 101-103 of the REE are designed here to control respective protection means 311, 312, 313, but are not capable of doing this alone. Indeed, in this embodiment, drivers, referred to as trusted drivers (TD), 201, 202, 203, incorporated into the TEE are required for finalizing the control of the protection means 311-313.

The means for managing the digital rights and conditional access DRM/CAS (management means) 231, together with an authorization (AUT) means 221, are furthermore incorporated into the TEE 200.

As an alternative, the authorization means 221 and the management means 231 may be incorporated into separate TEE units, respectively referenced 220 and 230, in which case they share a secure memory (M) 225 in order to be able to communicate with one another. For example, the TEE 220 may be a secure area of a graphics processor or of screen display and the TEE 230 may be a secure area of the main processor. The shared and secure memory 225 may be formed by an autonomous hardware block or by a region of secure memory allocated to this function.

Similarly, the trusted drivers 201-203 may be incorporated into a TEE 210 separate from the TEE(s) 220, 230 incorporating the management means 231 and the authorization means 221. In which case a secure memory (M) 215 allows the trusted drivers 201-203 to communicate with the authorization means 221 for example for receiving the authorizations for sending commands to the protection means.

When a multimedia content is read by the system 500, the client 110 of the REE receives an incoming stream 10 of encrypted multimedia data requiring a specific interface protection and triggers a procedure for delivery of the multimedia data.

The management means 231, on the other hand, verifies whether the client 110 is authorized to access the multimedia content. If the client is authorized, the management means 231 triggers the decryption of the data received 10 by the decryption means 250, the decrypted data 401-403 being subsequently transmitted over a multimedia output interface 301-303.

In summary, in the case of a multimedia output interface of the HDMI type and of an interface protection HDCP2.2, as soon as the client 110 of the REE requests it, the protection controller negotiates a session key with a connected device (generally a display of the television type) during an authentication and key exchange step.

The protection controller subsequently transmits the session key via protection means and controls the activation of an encryption of the outgoing multimedia stream delivered by a multimedia output interface.

The encryption is for example notably carried out by means of a secret key and of an exclusive OR (or XOR) gate between the multimedia data stream and the session key, generally forming an encryption of the AES (Advanced Encryption Standard) type.

As a consequence, using the REE, it is possible for a malicious attack 20 to block the command generated by an interface protection controller 102 and, consequently, the outgoing multimedia data stream 402 on the respective interface 302 not to be protected and then to be vulnerable to a fraudulent use.

However, in this embodiment, the management means 231, the authorization means 221 and the trusted drivers 201-203 operate in collaboration in order to provide an improvement in the various multimedia interface protections, and allow such an attack to be countered.

The authorization means contain security rules (SR) 222, established in such a manner as to correspond to the output interface protections specific to each incoming stream 10, potentially plural and simultaneous, and for each multimedia output interface 301-303.

For example, if the control does not command an application of a protection having a degree of protection lower than the degree of protection of the protection prescribed by the security rules 222, the command is transmitted by the trusted drivers 201-203 to the respective protection means 311-313.

Generally speaking, a data stream is processed by packets, forming "sub-streams". Thus, for each sub-stream being processed, or current sub-stream, a command is generated by the protection controllers 101-103 destined for the respective protection means 311-313, depending on the output interface 301-303 respectively used and on the protection specific to the current sub-stream required.

A session for decryption of the current sub-stream is subsequently triggered by the management means 231.

The conformity with respect to the security rules 222 for each of the commands from the protection controllers 101-103 is verified by the authorization means 221.

A control of the enabling or of the disabling of an application of an interface protection is authorized if this application to the outgoing signal offers a degree of protection at least equal to the degree of protection prescribed by the security rules 222.

When a command conforms to the security rules 222, the trusted drivers 201-203 are authorized by the authorization means 221 to finalize the command and to configure the protection means 311-313.

When the command is for enabling an interface protection, the authorization means 221 always authorizes the trusted protection driver 201-203 to enable the respective protection 311-313.

Furthermore, the management means 231 verifies that the protection means 311-313 are configured in accordance with the specific protection required by the current sub-stream.

For example, the management means 231 verifies that the outgoing signal 401-403 does not support an interface protection offering a degree of protection lower than the degree of protection prescribed by the security rules 222.

The configuration state of a protection means 311-313 is for example read in a status register for the targeted protection means.

If the protection means 311-313 are configured in accordance with the specific protection required by the current sub-stream, then the session for decryption of the current sub-stream is triggered and the management means 231 communicate the protection required for the current sub-stream through authorization means 221, which then updates the security rules 222 for the next sub-stream.

If the protection means 311-313 is not configured in accordance with the required protection, then the decryption is not triggered, or is interrupted, in order not to deliver data not conforming to the security rules.

This non-triggering or this interruption of the decryption constitute two examples of protection actions on the outgoing signal implemented by the management means 231. A protection action may be formed by any exercise preventing the delivery of a signal not protected according to its required specific protection.

When the command is a disabling of an interface protection, the authorization means 221 verifies whether the interface protection means 311-313 subject to the command offers a degree of protection at least equal to the degree of protection prescribed by the security rules 222.

If the disabling conforms to the prescriptions of the security rules 222, then the trusted drivers 201-203 are authorized to disable the respective protection means.

If the disabling command does not conform to the security rules, in other words the security rules prescribe the need for the output interface protection in question to be enabled, then the trusted drivers 201-203 are not authorized to send a command to the corresponding protection means 311-313.

However, when the last sub-stream has been decrypted and transmitted, the management means 231 communicate through authorization means 221 that the decryption is finished and the authorization means 221 update the security rules 222 accordingly.

Thus, when the last sub-stream of a multimedia stream has been decrypted, the output interface protection can be disabled.

As a variant, for example in an application for broadcast of a multimedia content, it is possible that the output interface protection cannot be triggered prior to the decryption of the current sub-stream. Then, the management means 231 verifies that the protection means 311-313 are configured in accordance with the specific protection required by the current sub-stream, after the decryption, which amounts to delaying this verification step and the potential protection action.

What is claimed is:

1. A method for protection of at least one incoming multimedia signal into a multimedia system, comprising:
   receiving a command ordering one of an enabling or a disabling of at least one interface protection for at least one outgoing multimedia signal coming from at least one incoming multimedia signal and delivered by at least one multimedia output interface of the multimedia system,
   verifying whether the command is in conformity with security rules,
   executing the command if the command is in conformity with the security rules,
   failing to execute the command if the command is not in conformity with the security rules, and
   in a case where the security rules do not prescribe any protection for the at least one incoming multimedia signal, always authorizing a potential command for enabling an application of an interface protection for the at least one outgoing multimedia signal.

2. The method according to claim 1, wherein the at least one interface protection is enabled if application to the at least one outgoing multimedia signal offers a degree of protection at least equal to a degree of protection defined in the security rules.

3. The method according to claim 2, wherein the at least one incoming multimedia signal requires a specific interface protection, and wherein the security rules comprise a specific interface protection required by the at least one incoming multimedia signal for the at least one multimedia output interface.

4. The method according to claim 1, wherein the at least one outgoing multimedia signal is processed by packets of data, further comprising updating the security rules when each packet of data is delivered by the multimedia output interface in accordance with a specific protection required by each packet of data being delivered.

5. The method according to claim 1, wherein the at least one incoming multimedia signal requires a specific interface protection, and further comprising applying a protection action to the at least one outgoing multimedia signal if the at least one outgoing multimedia signal delivered by the multimedia output interface of the multimedia system does not have an interface protection with a degree of protection at least equal to the degree of protection of the specific interface protection.

6. The method according to claim 5, wherein the protection action comprises non-triggering of decryption of the at least one incoming multimedia signal.

7. The method according to claim 6, wherein the decryption is carried out prior to the verification of the command, and wherein the protection action comprises interruption of the decryption.

8. The method according to claim 1, wherein the at least one outgoing multimedia signal comprises a multimedia data stream coming from a decryption of an incoming stream of encrypted data of the at least one incoming multimedia signal.

9. A non-transitory computer program product directly loadable into a memory of a data processing system, comprising portions of code of software for the execution of the method of protection according to claim 1 when executed on the data processing system.

10. A non-transitory medium readable by a data processing system having instructions executable by a computer adapted to cause the execution by the data processing system of the method of protection according to claim 1.

11. A protection device for at least one incoming multimedia signal, comprising:
   at least one protection hardware circuit, controllable by a respective controller for receiving a command ordering enabling or disabling of an interface protection for at least one outgoing multimedia signal coming from at least one incoming multimedia signal, the command being contained within data of the at least one incoming multimedia signal;
   at least one multimedia output interface configured to deliver the at least one outgoing multimedia signal on at least one output; and
   a secure processing area for verifying whether the command is in conformity with security rules, executing the command if the command is in conformity with the security rules, failing to execute the command if the command is not in conformity with the security rules, and in a case where the security rules do not prescribe any protection for the at least one incoming multimedia signal, always authorizing a potential command for enabling an application of an interface protection for the at least one outgoing multimedia signal.

12. The device according to claim 11, wherein the secure processing area authorizes a command for the enabling or for the disabling of an application of an interface protection if this application to the at least one outgoing multimedia signal offers a degree of protection at least equal to a degree of protection defined in the security rules.

13. The device according to claim 12, wherein the at least one incoming multimedia signal requires a specific interface protection, and wherein the security rules comprise the specific interface protection required by the signal for the multimedia output interface.

14. The device according to claim 11, wherein the secure processing area updates the security rules when each packet of the at least one incoming multimedia signal is delivered by the at least one multimedia output interface in accordance with a specific protection required by each packet delivered.

15. The device according to claim 13, wherein the at least one incoming multimedia signal requires a specific interface protection, and wherein the secure processing area applies a protection action to the at least one outgoing multimedia signal if the at least one outgoing multimedia signal delivered by the multimedia output interface does not have an interface protection with a degree of protection at least equal to the degree of protection of the specific interface protection.

16. The device according to claim 13, wherein the at least one outgoing multimedia signal comprises a multimedia data stream coming from a decryption of an incoming stream of encrypted data of the at least one incoming multimedia signal.

17. The device according to claim 15, wherein the secure processing area is configured for applying the protection action while not triggering decryption.

18. The device according to claim 15, wherein the secure processing area is configured for triggering decryption prior to the enabling or disabling of an application of an interface protection, and for applying the protection action by interrupting the decryption.

19. The device according to claim 17, wherein the secure processing area is configured for reading a state of the interface protection in a status register for the at least one protection hardware circuit.

20. The device according to claim 11, wherein the secure processing area is incorporated into at least one secure area of at least one processor.

21. The device according to claim 11 implemented as a component of a multimedia reader system designed to read a multimedia data stream.

22. The device according to claim 21, wherein the multimedia reader system forms or is included within one of a television decoder, a personal computer, a mobile telephone and a touchscreen tablet.

23. A protection device for at least one incoming multimedia signal, comprising:
a processor configured to:
receive a command ordering one of an enabling or a disabling of at least one interface protection for at least one outgoing multimedia signal coming from at least one incoming multimedia signal and delivered by at least one multimedia output interface,
verify whether the command is in conformity with security rules,
execute the command if the command is in conformity with the security rules,
fail to execute the command if the command is not in conformity with the security rules, and
in a case where the security rules do not prescribe any protection for the at least one incoming multimedia signal, always authorizing a potential command for enabling an application of an interface protection for the at least one outgoing multimedia signal.

24. The protection device according to claim 23, wherein the processor is configured to enable the at least one interface protection if application to the at least one outgoing multimedia signal offers a degree of protection at least equal to a degree of protection defined in the security rules.

25. The protection device according to claim 24, wherein the at least one incoming multimedia signal requires a specific interface protection, and wherein the security rules comprise a specific interface protection required by the at least one incoming multimedia signal for the at least one multimedia output interface.

26. The protection device according to claim 23, wherein the at least one outgoing multimedia signal is processed by packets of data, wherein the processor is further configured to update the security rules when each packet of data is delivered by the multimedia output interface in accordance with a specific protection required by each packet of data being delivered.

27. The protection device according to claim 23, wherein the at least one incoming multimedia signal requires a specific interface protection, and wherein the processor is further configured to apply a protection action to the at least one outgoing multimedia signal if the at least one outgoing multimedia signal delivered by the multimedia output interface does not have an interface protection with a degree of protection at least equal to the degree of protection of the specific interface protection.

28. The protection device according to claim 27, wherein the protection action comprises non-triggering of decryption of the at least one incoming multimedia signal.

29. The protection device according to claim 28, wherein the decryption is carried out prior to the verification of the command, and wherein the protection action comprises interruption of the decryption.

30. The protection device according to claim 23, wherein the at least one outgoing multimedia signal comprises a multimedia data stream coming from a decryption of an incoming stream of encrypted data of the at least one incoming multimedia signal.

* * * * *